June 20, 1933. A. C. GILBERT 1,914,888
FRUIT JUICE EXTRACTOR
Filed Feb. 14, 1929   3 Sheets-Sheet 1

Inventor
Alfred C. Gilbert
By Rockwell & Bartholow
Attorneys

June 20, 1933.  A. C. GILBERT  1,914,888
FRUIT JUICE EXTRACTOR
Filed Feb. 14, 1929   3 Sheets-Sheet 3
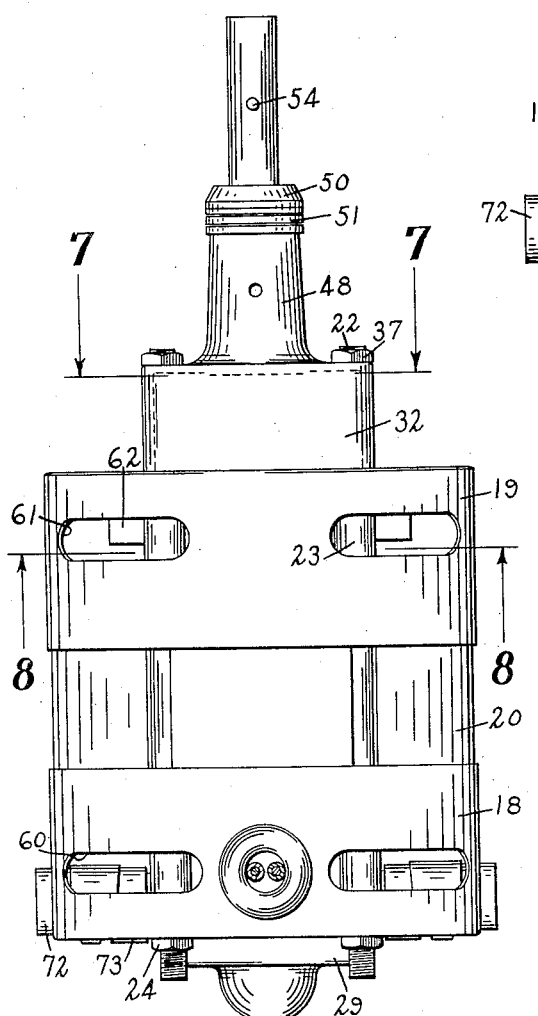
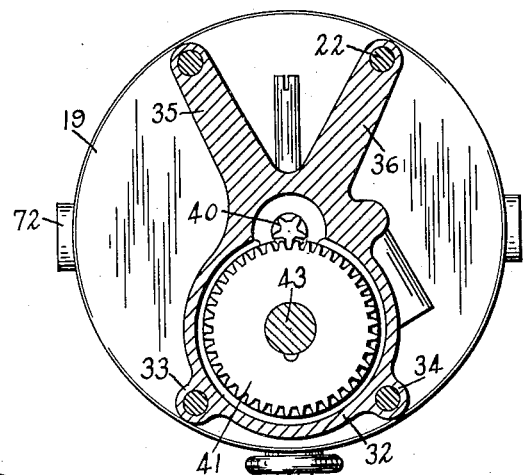
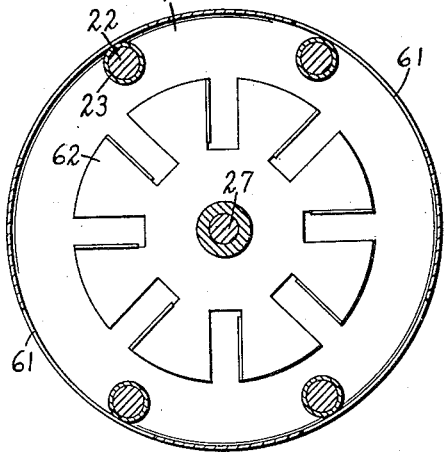
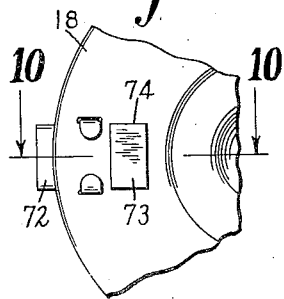
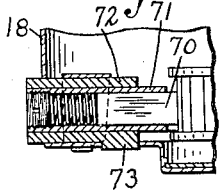
Inventor
Alfred C. Gilbert
By Rockwell & Bartholow
Attorneys Patented June 20, 1933

1,914,888

UNITED STATES PATENT OFFICE

ALFRED C. GILBERT, OF HAMDEN, CONNECTICUT, ASSIGNOR TO THE A. C. GILBERT COMPANY, OF NEW HAVEN, CONNECTICUT, A CORPORATION OF MARYLAND

FRUIT JUICE EXTRACTOR

Application filed February 14, 1929. Serial No. 339,785.

This invention relates to fruit juice extractors and more particularly to a power driven juice extracting machine for extracting the juice from oranges, lemons and other citrous fruits.

More specifically the invention relates to a fruit juice extractor in which the juice is extracted by pressing cut fruit over a revolving upright extracting bulb, the bulb in the present instance being motor driven and the device being provided with means for collecting the juice in a bowl surrounding the bulb, and discharging it through a down spout or the like into a suitable receptacle.

In fruit juice extractors of the type shown, it is desirable that the parts, and particularly the bearings, be readily accessible for lubrication, and that the driving mechanism for the extractor bulb be relatively simple and compact and at the same time durable and unlikely to get out of order or to be subject to excessive wear.

One object of this invention is the provision of an electric motor for a device of this character, which will be mounted within the extractor casing and provision made in such casing and in the motor for cooling the latter.

Another object of the invention is the provision of a novel form of driving mechanism, by which the extractor bulb or other rotating device, may be driven from the motor.

A still further object of the invention resides in mounting the extractor bulb upon a shaft offset from and in driving relation with the motor shaft, and providing novel means for suitably supporting the extractor bulb shaft for rotation.

A still further object of the invention is the provision of a support or standard of novel character to support the shaft of the extractor bulb and also house the drive gearing which connects this bulb with the motor shaft.

A still further object of the invention is to provide a support or frame for a driving mechanism, which support is mounted upon and secured to the motor casing and which is provided with a bearing sleeve for one end of the motor shaft as well as with a bearing sleeve for the shaft of the extractor bulb.

To these and other ends, the invention consists in the novel features and combinations of parts to be hereinafter described and claimed.

In the accompanying drawings:

Fig. 6 is an elevational view of the motor and driving unit;

Fig. 7 is a sectional view on line 7—7 of Fig. 6;

Fig. 8 is a sectional view on line 8—8 of Fig. 6;

Fig. 9 is a fragmentary bottom plan view of the motor casing, and

Fig. 10 is a sectional view on line 10—10 of Fig. 9.

Figure 1:
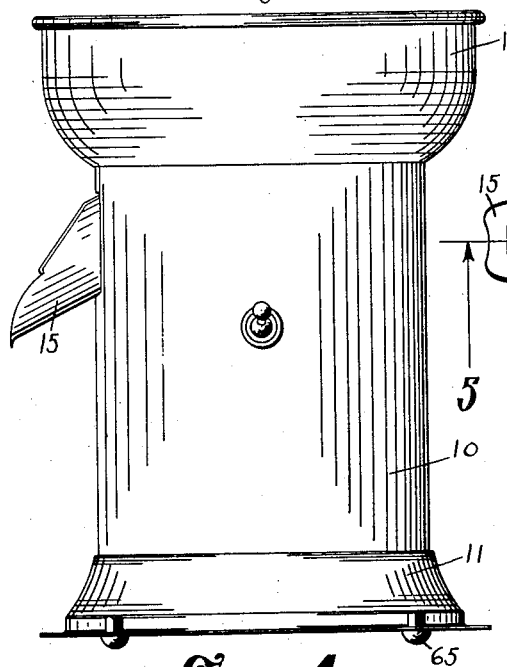
Fig. 1 is a side elevational view of a fruit juice extractor embodying my invention.
Figure 2:
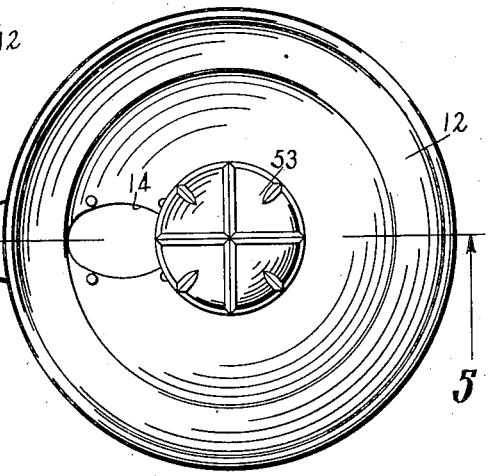
Fig. 2 is a top plan view of the same.
Figure 3:
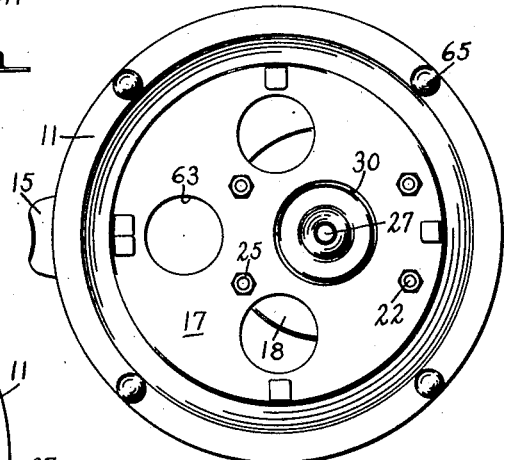
Fig. 3 is a bottom plan view of the extractor.
Figure 4:
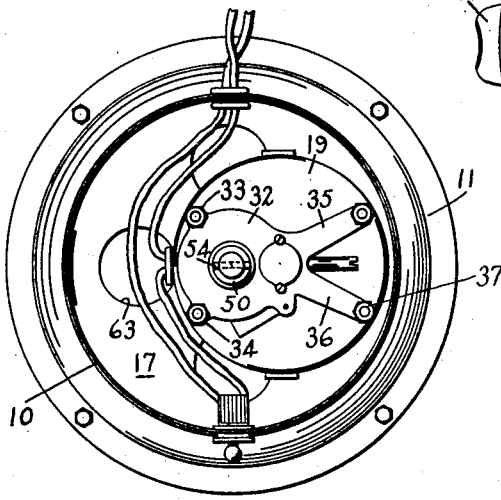
Fig. 4 is a top plan view of the extractor casing, with the bowl removed, showing the interior mechanism.
Figure 5:
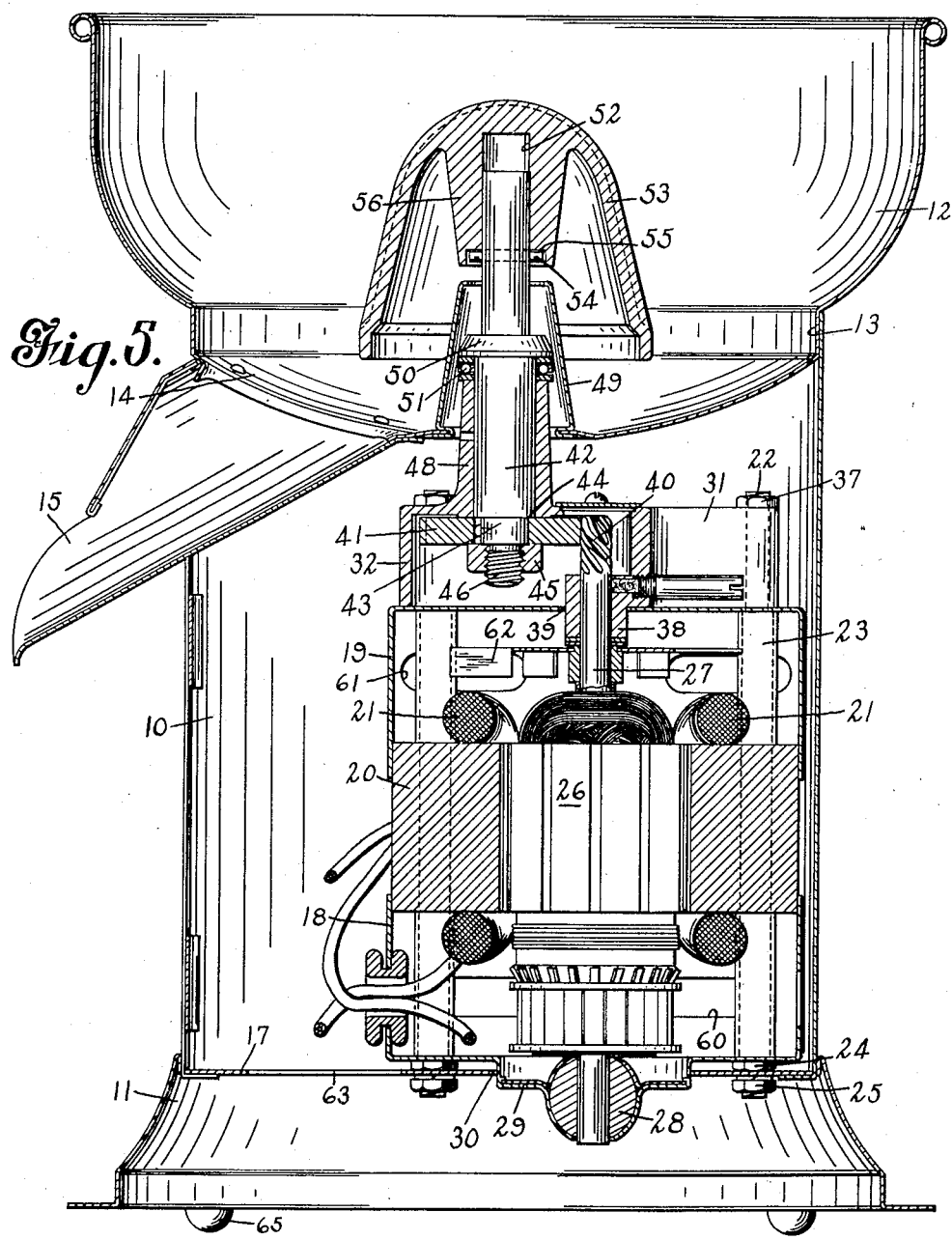
Fig. 5 is a sectional view on line 5—5 of Fig. 2.

To illustrate a preferred embodiment of my invention, I have shown in Fig. 1 a fruit juice extractor having a casing body 10, resting upon a flared base portion 11, and closed at its upper end by a removably mounted bowl 12. As shown more particularly in Fig. 5, the bowl 12 is provided with a lower reduced portion 13, which fits telescopically in the upper end of the casing, which is otherwise open, so that this bowl serves to close the upper end of the casing and is also firmly secured in place by the described telescopic arrangement. The extractor bowl 12 is provided with a discharge opening 14 in its bottom portion, in communication with a spout 15 which, as shown in Fig. 5, passes through an opening in the casing wall 10.

At its lower portion the casing is provided with a supporting plate or base 17, which in the embodiment shown, serves to support the motor and driving mechanism.

The motor comprises end casing members 18 and 19, which fit telescopically over the ends of the field magnet 20, about which are wound the field coils 21. As shown, the two parts of the motor casing are secured to the field magnet 20 by means of the bolts 22, four in number, as shown in the drawings, which pass through both portions of the casing and through the field magnet. Sleeves 23 are positioned upon these bolts between the magnet and the bases of the casings to hold the parts in their proper relation. Upon the lower projecting end of these bolts are threaded nuts 24.

The ends of the bolts 22 also project downwardly through the supporting plate or base 17, so that the nuts 24 rest upon the supporting plate 17, and additional nuts 25 are threaded upon the bolts on the opposite or underside of the plate 17, to secure the motor in place.

The motor armature 26 is provided with a shaft 27, which at its lower end, is carried in a bearing 28 at the lower end of the motor casing. This bearing is positioned in a depressed portion 29 of the lower casing portion 18, which depressed portion projects through an opening 30 in the plate 17 to render the lower bearing accessible for lubrication, and to position the motor with respect to the casing of the juice extractor.

Above the motor casing is provided a gear housing and driving mechanism support 31. This member comprises a hollow body portion 32, having ears 33 and 34, and diverging fingers or legs 35 and 36. In the ears 33 and 34 and at the ends of the legs 35 and 36 are provided openings to receive the bolts 22, so that this support or housing may be threaded upon these bolts to rest on the upper portion 19 of the motor casing. Nuts 37 on the upper ends of the bolts 22 serve to clamp the gear housing member as well as the motor parts tightly together into a rigid, compact unit.

This housing member is provided with a depending bearing sleeve 38, which projects downwardly through an opening 39 in the upper portion 19 of the motor casing and serves as the upper bearing of the motor shaft 27.

As has already been stated, the body portion 32 of the gear housing member is hollow to provide a gear chamber, and the upper end of the motor shaft 27 projects through the bearing sleeve 38 into the hollow interior of this member, and is there provided with gear teeth 40. This gear is in mesh with the teeth of a larger gear 41, secured at the lower end of the shaft 42, the gear being mounted upon a reduced portion 43 of this shaft and clamped against a shoulder 44 by the nut 45, received upon the lower threaded portion 46 of the shaft 42.

The shaft 42 extends upwardly through an extended bearing sleeve 48, provided upon the gear housing member, and which preferably is formed integrally with this member. By this arrangement it will be noted that the bearing sleeves for the upper end of the motor shaft and the shaft 42 are both a part of the same rigid structure, and these two shafts will be held in proper alignment and the gears 40 and 41 held in proper mesh.

The bearing 48 extends upwardly to provide a long extended bearing surface for the shaft 42, and the lower surface of the bowl is provided with an upwardly projecting skirt portion 49 to receive the sleeve. The shaft 42 is provided with a thrust bearing collar 50, and between this collar and the upper edge of the sleeve is an antifriction bearing 51.

The shaft 42 is somewhat reduced above the collar 50, the reduced end extending through the guard 49 into the bowl 12, where it is received within the bore 52 of the extractor bulb 53, the shaft being provided with a pin 54 seating in a slot 55, of an inner portion 56 of the extractor bulb, to connect these parts non-rotatably together.

It will be apparent that any pressure upon the extractor bulb, as well as its weight and the weight of the shaft 42 will be borne by the bearing 51, and in turn borne by the gear housing member 31 and the motor casing. The motor shaft will thereby be relieved from any such pressure.

The upper and lower portions 18 and 19 of the motor casing are provided with a suitable number of ventilating openings 60 and 61, and a fan 62 mounted upon the motor shaft 27 above the armature 26 serves to drive the air out of the openings 61, drawing it in through the openings 60 and in turn through the openings 63, provided in the supporting plate 17. This air may pass out of the casing about the spout 15, which has a loose fit in the opening in the motor casing through which it projects.

The base 11 of the motor may be supported upon suitable feet 65 of rubber or other material which will tend to dampen vibration and prevent the casing from "walking" when mounted upon a smooth surface. The base 11 will thus be held a slight distance above the supported surface so that air may enter below the base and thus be drawn through the openings 63 by the motor fan.

As shown in Fig. 10, the motor brushes 70 enter sleeves 71, which are in turn inserted within sleeves 72, which project laterally through the lower portion 18 of the motor casing. The sleeves 72 are provided with rectangular lugs 73 which project through correspondingly shaped openings 74 in the bottom of the portion 18 of the motor casing to hold these sleeves in proper position.

It will be seen that the support member or gear housing 31 fits tightly against the end face of the motor casing, so that the chamber in which the gears 40 and 41 are mounted, may, if desired, be filled with a lubricant to keep these gears properly lubricated.

While I have shown and described a preferred embodiment of my invention, it is understood that it is not to be limited to all of the details shown, but is capable of modification and variation within the spirit of the invention and within the scope of the appended claims.

What I claim is:

1. A fruit juice extractor comprising a casing having a supporting plate, a motor supported on said plate comprising a lower casing member, a field member, an upper casing member, and a supporting member, fastening elements passed successively through all of said parts to hold them in assembled relation, securing means on the ends of said fastening members, said fastening members being extended through said supporting plate to secure the motor member thereto, and an extractor bulb at the upper portion of the casing supported by and driven from the motor.

2. In a fruit juice extractor, a casing having a bottom plate and a bowl at the upper end thereof, and a unitary drive mechanism comprising a vertically disposed electric motor in the casing and supported by and secured to said plate, an extractor shaft arranged parallel to and driven from the motor shaft and projecting upwardly through an opening in the bottom of the bowl, a support member mounted above and supported by the motor and provided with a gear chamber, a hollow bearing member on said support member and extending upwardly from the chamber above the bowl bottom, said extractor shaft being within the bearing member and extending downwardly therefrom into the gear chamber, and gearing in said chamber connecting said extractor shaft to the motor shaft.

3. A fruit juice extractor comprising a base member, a unitary driving mechanism comprising a motor member supported solely by the base member with its shaft disposed vertically, a gear chamber supported on the motor member, said gear chamber having an upwardly extending tubular sleeve member, an extractor shaft within the sleeve member and projecting therefrom at both ends, the lower end of said extractor shaft extending within the gear chamber and there drivingly connected with the motor shaft, and a casing supported on the base member out of contact with and surrounding the motor member, a bowl mounted at the upper end of the casing, and said extractor shaft extending above the bowl bottom and having an extractor bulb on its upper end.

4. A fruit juice extractor comprising a base member, a motor member supported wholly upon the base member with its shaft disposed vertically, a gear chamber supported on the motor member, said gear chamber being provided with a bearing at its lower portion for the upper end of the motor shaft, and a tubular bearing at its upper portion, an extractor shaft disposed within said tubular bearing, the adjacent ends of the extractor shaft and the motor shaft extending into the gear chamber, gearing within said chamber connecting said shafts, and a casing supported from the base member out of contact with and surrounding the motor member, a bowl supported at the upper end of the casing, said extractor shaft extending upwardly into the bowl and having an extractor bulb mounted thereon.

5. A fruit juice extractor comprising a base member, a motor member supported solely on the base member with its shaft disposed vertically, a gear chamber supported on the motor member, said gear chamber being provided with a bearing at its lower portion for the upper end of the motor shaft, and a tubular bearing at its upper portion, an extractor shaft disposed within said tubular bearing, the adjacent ends of the extractor shaft and the motor shaft extending into the gear chamber, gearing within said chamber connecting said shafts, a casing supported from the base member and surrounding the motor member, a bowl supported at the upper end of the casing, said extractor shaft extending upwardly into the bowl and having an extractor bulb mounted thereon, and said tubular bearing extending upwardly above the bowl bottom.

6. A motor driven appliance comprising a base, a rotatable element and a unitary driving means therefor supported from said base, said driving means comprising a motor member having a shaft, a gear chamber supported by and above the motor member, a driven shaft supported by said gear chamber against longitudinal thrust and having the rotatable element on the upper end thereof, the adjacent ends of the driven shaft and motor shaft extending into the gear chamber, gearing therein connecting said shafts, and an upright casing on the base surrounding said motor member and said gear chamber and supported out of contact therewith, said unitary driving means having its sole support upon said base.

In witness whereof, I have hereunto set my hand this 12th day of February, 1929.

ALFRED C. GILBERT.